United States Patent
Schroder et al.

(10) Patent No.: US 10,083,472 B1
(45) Date of Patent: Sep. 25, 2018

(54) RECYCLED AUTO PART REAL TIME AVAILABILITY VERIFICATION

(71) Applicant: Used-Car-Parts.com, Inc., Fort Wright, KY (US)

(72) Inventors: Jeffrey L. Schroder, Fort Mitchell, KY (US); Jeffrey Joseph Schroder, Cincinnati, OH (US); Jeffrey W. Mueller, Taylor Mill, KY (US); Jeffrey Dalton Chastain, Fort Wright, KY (US); Luis Daniel Canisalez, Fort Wright, KY (US); Jeremy M. Mount, Fort Wright, KY (US); Aaron Edward Daniel, Fort Wright, KY (US); Robert S. Cohen, Brooklyn Park, MN (US); Laura Beth Donica, Fort Wright, KY (US)

(73) Assignee: Used-Car-Parts.com, Inc., Fort Wright, KY (US)

(*) Notice: Subject to any disclaimer, the term of this patent is extended or adjusted under 35 U.S.C. 154(b) by 1162 days.

(21) Appl. No.: 14/187,203

(22) Filed: Feb. 21, 2014

(51) Int. Cl.
*G06Q 30/06* (2012.01)
*G06Q 10/08* (2012.01)

(52) U.S. Cl.
CPC ....... *G06Q 30/0623* (2013.01); *G06Q 10/087* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 2003/0004761 A1* | 1/2003 | Lampe ................... | G06Q 10/02 705/5 |
| 2003/0163737 A1* | 8/2003 | Roskind ................. | G06F 21/31 726/6 |
| 2005/0125261 A1* | 6/2005 | Adegan ................. | G06Q 40/08 705/4 |
| 2005/0187834 A1* | 8/2005 | Painter .................. | G06Q 10/08 705/28 |
| 2007/0156675 A1* | 7/2007 | Dalton ................. | G06Q 10/087 |

OTHER PUBLICATIONS

Mitchell Repair Center article, dated Sep. 14, 2012, available at http://products.car-part.com/press/MitchellRepairCenter_CarPartPro_PressRelease.pdf (Year: 2012).*

* cited by examiner

*Primary Examiner* — Ming Shui
(74) *Attorney, Agent, or Firm* — Wood Herron & Evans LLP (57) ABSTRACT

Availability of recycled auto parts listed in a centralized inventory system is verified by a query to the inventory system carrying the part. The query identifies the part and data about the part of relevance to a potential buyer (such as price, condition, location) to be verified. Verifications can be performed upon explicit user request, or upon actions implicitly requiring verification, such as adding a part to an estimate or shopping cart, ordering a part, or requesting the part seller to hold the part for future purchase, or the like; verification may also be automatically performed for some or all search results. Results of a verification may also be broadcast to the potential buyer and to the part seller (broker and/or part supplier) to enable audit and follow-up on the verification request.

34 Claims, 2 Drawing Sheets

RECYCLED AUTO PART REAL TIME AVAILABILITY VERIFICATION

CROSS REFERENCE TO RELATED APPLICATION

This application is related to U.S. Provisional Patent Application Ser. No. 61/669,320 filed Jul. 9, 2012 and U.S. patent application Ser. No. 13/937,261 filed Jul. 9, 2013 which claims benefit therefrom, entitled Recycled Auto Part Delivery Commitment Calculator, both of which are hereby incorporated by reference herein in their entirety.

TECHNICAL FIELD

This invention relates to computerized systems for the location and sale of vehicle parts.

BACKGROUND OF THE INVENTION

Commerce in vehicle parts faces some unique challenges not applicable to other forms of merchandise and products.

Vehicle parts fall generally into three categories: original equipment parts, aftermarket parts, and recycled parts. Original equipment parts and aftermarket parts are often supplied in much the same manner as other items: they are kept in warehouses and shipped when needed. Used, remanufactured, reconditioned, OE surplus, blemished OE, and OE discount parts (hereafter referenced collectively as "recycled parts"), however, have significant differences from other items. In many ways, each recycled part is unique in its character and circumstances. As discussed in earlier patent filings of the assignee, recycled parts can be difficult to properly match to other interchangeable parts in target vehicles, and further, recycled parts can have unique damage which must be repaired, and can have attributes such as original paint or options which render interchangeable parts unlike each other. These two issues have been specifically addressed by inventions of the assignee which are implemented on the assignee's web site www.car-part.com.

The fact that each part is unique and may have different conditions, colors, and at times accessories on an assembly, means that a given recycled part's usefulness to a buyer is different than a similar part that technically interchanges with the damaged part on a vehicle. Thus, while a site like www.car-part.com may have 150 million parts, that inventory is unlike the inventory of a seller of a conventional type of product, such as a new or aftermarket auto part seller. Specifically, an inventory of 150 million parts is best viewed as an inventory of 150 million different specific items, each available in a quantity of one. These individualities mean that recycled parts must be tracked individually at each step in the process so the buyer can understand the additional products and services (e.g., damage repair, painting, rework) associated with each part, and furthermore, the availability of a specific individual part, rather than another interchangeable part, is relevant to buyers in a way that is simply not the case with new parts. Indeed, in many cases required parts for a repair are not cataloged into a part interchange system—for example, trim parts and the like. These parts have even greater individuality than those which are catalogued by an interchange system.

A third way in which recycled vehicle parts are individual and unique is that they are not commonly inventoried. There is no central, synchronized ordering system or a central inventory management system spanning the universe of auto recyclers. Unlike, for example, airline tickets, inventory systems at major retailers, and the like, which operate out of a common database, the thousands of auto part recyclers across the country operate and sell parts out of their own respective systems throughout the day, which are not synchronized to a common database (such as www.car-part.com) until, for example, a nightly upload. Consequently, every recycler inventory system has its own inventory records which may mismatch with the inventory that is presented at derivative databases such as that collected and presented by www.car-part.com. This differs greatly from original equipment parts or aftermarket parts which are typically available in large quantities at a centralized warehouse and are ready to be shipped from the centralized warehouse as orders are received, thereby resulting in a relatively consistent handling and delivery process when original equipment or aftermarket parts are ordered.

Moreover, the inventory presented at a site like www.car-part.com is derived from a large number of inventory databases at individual recycler inventory management systems. Every one of these management systems is different, using different inventory coding and methods, requiring substantially different software to acquire and process each recycler's inventory for inclusion in a common database. Additionally, the fields available in each inventory management system differ substantially, and the availability of parts may also vary greatly. As one example, parts listed in a given recycler's inventory may be in one of several stages in the auto recycler's dismantling process. Some parts are inventoried while the vehicle is still at the salvage auction, others are inventoried in a holding pen at the recycling facility, and may be kept on a vehicle until needed, others are dismantled from the vehicle and placed in racks for storage until needed, and still others are dismantled from the vehicle but left in the vehicle in a storage yard. Some parts can be taken off the vehicle without dismantling the vehicle while other parts are more practical to take off when the entire vehicle is being dismantled. Inventory management systems generally attach codes to inventory records of parts to identify their status in this process; although there is a convention for these codes, because different recycling facilities have a different physical layout and work practices, the detailed significance of these codes can be different. For example, a code of W may mean that the part is in a local warehouse at one recycler, but may mean the part is in a remote warehouse or even in a readily accessible dismantling area at another recycler. Although the codes are standard, only the individual recycler is familiar with how parts are coded. There are other variations used in the industry; in some cases inventory is tagged with category codes at the vehicle level, which may override to location codes to identify where a part is in the dismantling process.

The process in which a single part is sold can thus be unusually complex. When a customer orders the part through a central database, the part may no longer be in inventory at the recycler, or the part may be in a condition which renders it not immediately available. As an example of the latter condition, the dismantling of an entire vehicle may be required to obtain the part. Some recyclers may refuse to undertake such a step for the sake of the sale of a single part, or there may be an inherent delay before a recycler is able to perform the required dismantling due to limited resources or queues at the recycler. This means that even for parts which are available from a recycler, an order for the part may have a complex outcome (something other than a completed sale as originally intended).

Another complicating factor is that auto recyclers typically supplement their own physical inventories by establishing brokering relationships with other parts suppliers (which may be other auto recyclers, aftermarket part suppliers, and/or original equipment part providers). While this practice increases the selling opportunities for part suppliers which participate in such brokering relationships, and increases the effective inventory of a brokering yard to include the parts they broker, it further complicates the logistics of acquiring a given part and results in another layer of inventory uncertainty, as brokered parts presented in an inventory system represent available parts at a time in the past when the brokering database was last updated. Furthermore, brokering may occur in multiple levels; a broker may offer parts that are available through another broker that in turn sources those parts from the ultimate part supplier.

While vehicle parts have always been in demand, recycled vehicle parts are increasingly popular with body shops and repair facilities because of their lower cost and like quality to original vehicle parts. The repair shop and auto salvage yard are integral parts of the insurance industry claims department supply chain that processes claims for customers involved in vehicle accidents; that supply chain includes shops that repair the vehicles (using, where possible, recycled parts from other vehicles) and finalize the claim from the accident, as well as recyclers that provide parts to shops and provide part inventory information to insurance estimators that make the determination of the optimal part for the repair facility to use in each repair.

Cycle time or repair time at the shop is very important to efficient handling of an insurance claim, for several reasons. First, the insurance consumer temporarily loses access to the car while it is being repaired, and is generally intolerant of a long delay while a vehicle is being repaired. Moreover, the insurance claim often includes coverage for a rental vehicle, which must be reimbursed by the insurer. Additionally, because of the pressures of insurance cost management and consumer demands, body shops have adopted lean manufacturing or "just in time" techniques. Shops often use workflow management systems to schedule production. For example, to reduce cost and improve efficiency, repair/body shops often repair vehicles in a production line type environment, which reduces costs but has the side effect that part unavailability for one vehicle can prevent processing of more than just that one vehicle. Furthermore, body shops do not typically inventory parts, and maintain a minimal layout for storing and maneuvering cars while under repair.

Thus insurance companies, body shops and repair facilities are generating ever increasing demand for recycled parts while at the same time, these purchasers are demanding greater certainty in the availability of requested parts to enable a 'just-in-time' repair supply chain. The auto recycler has thus become a part supplier to a repair shop assembly line where the margins for error are very low and each part in the supply chain is unique. In this environment, the auto recycler has unique challenges. Because each part is unique and coming from a limited supply of salvage vehicles, if the recycler is unable to supply the part the buyer chose, the recycler may not be able to supply an alternatively acceptable part to the buyer, even though there may be interchangeable parts, due to different colors, damage levels, accessories, delivery times, and the like. This then creates a disincentive to use a central database to locate recycled parts, unless and until a means exists for confirming the availability of parts located through the central database.

Given the size of the distributed system, with over 4,400 recycler systems, it is simply not realistic or feasible, with current hardware constraints, to maintain real time synchronization of part availability information across all applicable systems and for every part search. As a result, latent part unavailability continues to be a problem in the recycled part industry. This has challenged independent recyclers to find a mechanism to present not only the widest possible variety of parts, but certainty of delivery of those parts through centralized databases such as www.car-part.com, notwithstanding the many various factors mentioned above which create the potential that a particular part, while presented in a centralized database, is actually unavailable.

As a consequence of the complexities in delivery and logistics of part delivery, major parts purchasers such as insurance companies have faced a significant challenge in their efforts to include the full available inventory of recycled parts in repair estimates. There is a significant need, however, to include recycled parts in such estimates because of the reduction of cost that can be realized, without loss of quality. In some cases part buyers have limited their purchasing only to a small number of suppliers who hold parts in their own inventory, because those suppliers have more predictable delivery times and performance. This has, in turn, constrained the marketplace for recycled parts and reduced competition and increased prices to the end consumer.

SUMMARY OF THE INVENTION

In accordance with principles of the present invention, the difficulties in the used parts market described above are addressed by the implementation of a part availability verification method for a centralized inventory system. The centralized inventory system compiles an database of recycled car parts via regular synchronization with plural independent inventory systems. The method enables the real-time verification of the actual availability of a part selected from that compiled database, by formulating a real-time query to the independent inventory system identified as carrying the selected part, in order to verify the current availability of the selected part.

In the particular embodiment described herein, the method and resulting real-time query are performed only for certain search results generated from the centralized inventory system, based on particular actions of a user, such as an explicit verification request action (such as clicking a verify button), or an action implicitly requiring verification (such as adding a part to an estimate, adding a part to a shopping cart, ordering a part, a user requesting to modify or check out a virtual shopping cart of parts). Alternatively, or in addition, verification could be automatically performed, for example for the first n results in a search, where for example n=8. In this particular embodiment the results of a verification are broadcast to computing systems of the seller and potential buyer associated with the verification request to enable audit and follow-up by either the seller or potential buyer on the verification request. (As used herein, "potential buyer" refers to any party that may buy a part, for him/her/itself or on behalf of another person, and/or to any party that gathers information about a potential purchase for another party, and/or gathers such information as part of creating or auditing an estimate of a purchase price, whether or not that estimate is used to make actual purchases.)

The system disclosed herein is compatible with the brokerage of parts; for brokered parts, the system formulates a real-time query to the inventory management system of the part supplier, even though the part is selected for purchase and verification from a part broker and not be sold directly from the part supplier. The verification information is thus accurately representative of the availability of the part from its ultimate supplier. Moreover, in the case of a brokered part, part verifications are broadcast to the part seller that is brokering the part, instead of or in addition to the part supplier.

The system is further responsive to a re-verification request from a seller, broker, or potential buyer of a part to reconfirm a previous verification, such as a previously broadcast verification that is included in a verification audit record.

The system implements part verification by computing a checksum of data regarding a part in the centralized inventory system and delivering that checksum to the independent inventory system for comparison to a checksum of the data at the independent inventory system.

The system further implements automatic version control upon the inventory management systems, by maintaining a database identifying the current version in use at the independent inventory system, so that the centralized inventory system may reference this database and compute a checksum with the same version number as is in use in the independent inventory management system and provide the same to for comparison.

BRIEF DESCRIPTION OF THE DRAWINGS

The invention will be more clearly understood from the following detailed description of representative embodiments thereof read in conjunction with the accompanying drawings that form a part of this disclosure.

DETAILED DESCRIPTION OF THE INVENTION

Figure 1:
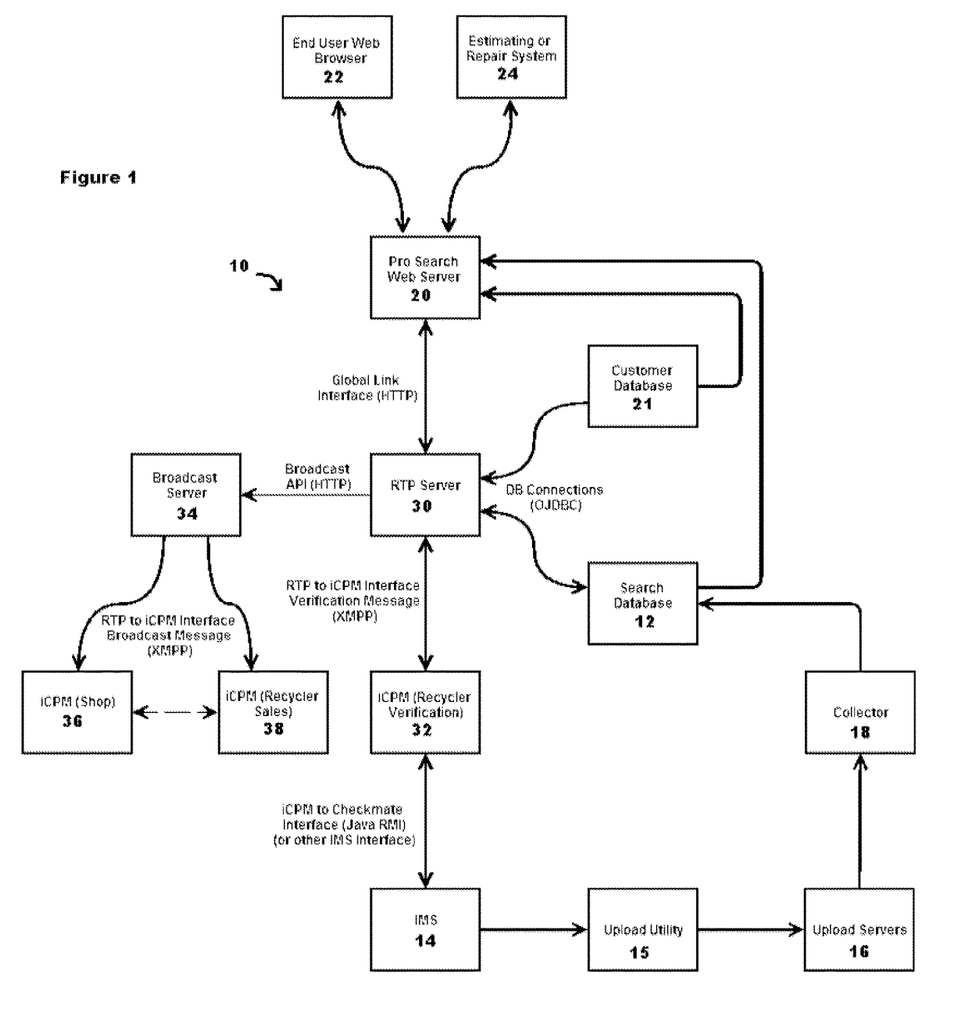
FIG. 1 is an overall system diagram illustrating a centralized used car parts inventory system that includes features and functions for real time verification of part availability.

FIG. 1 is a high level diagram showing an embodiment of a system 10 for handling recycled part information in accordance with principles of the present invention, illustrating the components that handle recycled part information and the flow of part information through the system. In one embodiment, the illustrated systems are connected and communicate with an XMPP (eXtensible Messaging and Presence Protocol) instant messaging infrastructure, supported by instant message clusters. For the purposes of simplicity and clarity the XMPP servers (for example, 10 IM clusters embracing 60 or more servers) are considered a background infrastructure available for all services and not independently illustrated in FIG. 1. In alternative embodiments of the invention the messaging infrastructure connecting the systems described herein could be other than XMPP instant messaging, e.g., intercommunication could use email, small message service (SMS aka text messaging), social networking (e.g., Twitter) or any other communications platform/medium. As used herein "instant messaging" and related terms such as "broadcast" and "message" should be understood to refer to any platform that supports message passing not limited to the particular embodiment disclosed herein.

At the core of the system is a search database 12, which contains a database of recycled parts compiled from disparate auto recycler part inventory management systems (IMSs) such as IMS 14. As is known in the art, the search database 12 is compiled on a regular, e.g., nightly basis, by the operation of an upload utility 15 which gathers a full or incremental image of the database of parts in IMS 14, and delivers this database image to an upload server in a server farm 16. This activity is performed nightly for numerous disparate IMS's across a wide geographical area, each using an appropriate upload utility 15 to gather the requisite data in a form appropriate for that IMS. Data is gathered by upload servers 16 which, among other functions, harmonizes the collected data to a standard format (including without limitation compiling information from vehicle records which contain part information that may be relevant in the locating, verification, and/or procurement of parts). The data is then assembled by a collector server 18 which aggregates part tables built from uploaded data, and loads the data into the search database. Notably, the tables in the search database can include several elements of information not found in the original source data from the disparate IMS platforms; for example, delivery time prediction information can be compiled into the database to enable searches to be performed with a delivery time criterion; this functionality is elaborated extensively in the above-referenced and incorporated US patent application of the assignee.

Parts and inventory entries logged into search database 12 are presented to users as search results via one of several interfaces, including, for example, a web server 22 hosting a web site such as the assignee's public web site www.car-part.com, assignee's subscription web site "Car-Part Pro", and/or individual recycler websites using inventory results provided by the assignee. Additional venues where search results may be presented to users include parts provider inventory and/or point of sale systems, estimating, or repair shop management systems 24, third party systems including claims work flow systems which are loaded with or access recycled part inventory data from the search database 12, typically via access to a web server, for the purpose of estimating vehicle repairs, managing vehicle repairs, coordinating the sale, brokering or delivery of parts, managing insurance claims relating to vehicle repairs, and other functions. These various applications work in conjunction with customer information (such as log-in data, search preferences/filters, or subscription, contact and payment information) stored in a customer database 21.

The present disclosure is directed to the implementation of a real time part (RTP) verification protocol that runs in parallel with the regular/nightly upload of part data by the systems described above, to overcome the latency (nightly build/load) in the search database 12 that is described above. This protocol is implemented through an RTP server 30 which links (directly or indirectly) to additional servers at part supplier locations, as well as instant messaging clients at potential buyer and seller locations (used to display verification information), as will be described in greater detail below.

Specifically, the RTP Server 30 connects via an HTTP or HTTPS global link interface to web server 20 to receive a request for part verification. This request may be in response to an explicit user action, e.g., the user may be presented with a button to request verification of current availability of a part, or an executable script or program may run which verifies current availability of parts upon user activity such as adding a part to an estimate, adding a part to a repair order, inclusion of a part in a third party system such as a claims workflow, movement of parts to a virtual shopping cart or the initiation of checkout of such a cart. Alternatively, or in addition, verification could be automatically performed for parts that are likely to be purchased, for example for the first n results in a search performed by a professional buyer, where for example n=8 or n=20. The RTP server passes instructions 46 to the part supplier's IMS 14 (or software that operates on behalf of the IMS), using the verification iCPM platform 32 as a pass through entity which maintains the active connection to the IMS or surrogate software. The instructions 46 indicate that a verification needs to be performed, and include all relevant fields.

The verification result, or a failure to verify notification, flows back from IMS (or software that operates on behalf of the IMS) 14 to instant messaging platform 32, and then to RTP server 30, which delivers that verification or failure notice over the HTTP/HTTPS channel to the web server 20 so that it may be presented to the user via the browser 22 or management system 24 that originated the request.

Further, in the illustrated embodiment, after a verification event, the RTP server initiates a broadcast protocol in connection with a broadcast server 34 to provide audit and follow-up information to the involved part seller and part purchaser. Finally, the broadcast server forwards this information to the potential buyer's iCPM client 36 (for example, to a shop or insurance appraiser) and/or to the seller's iCPM client(s) 38 (for example, to a recycler's sales people).

As noted above, a number of brokering relationships may be formed such that parts from a given supplier are available directly and/or through brokers. In that case, part verification as described above is done with the part supplier's IMS 14, not the part broker, since the part supplier has the accurate and current information on the part. However, in the case where a potential part buyer has selected a brokered part (typically because of a relationship between the potential buyer and broker that simplifies the potential buyer's logistics) when the verification result is broadcast as described above, it is delivered to the sales staff of the part broker, rather than the staff of the part supplier, so that the broker can fulfill the traditional relationship of brokering the part and handling for the potential buyer any part quality or delivery variances that caused a verification failure.

Figure 2:
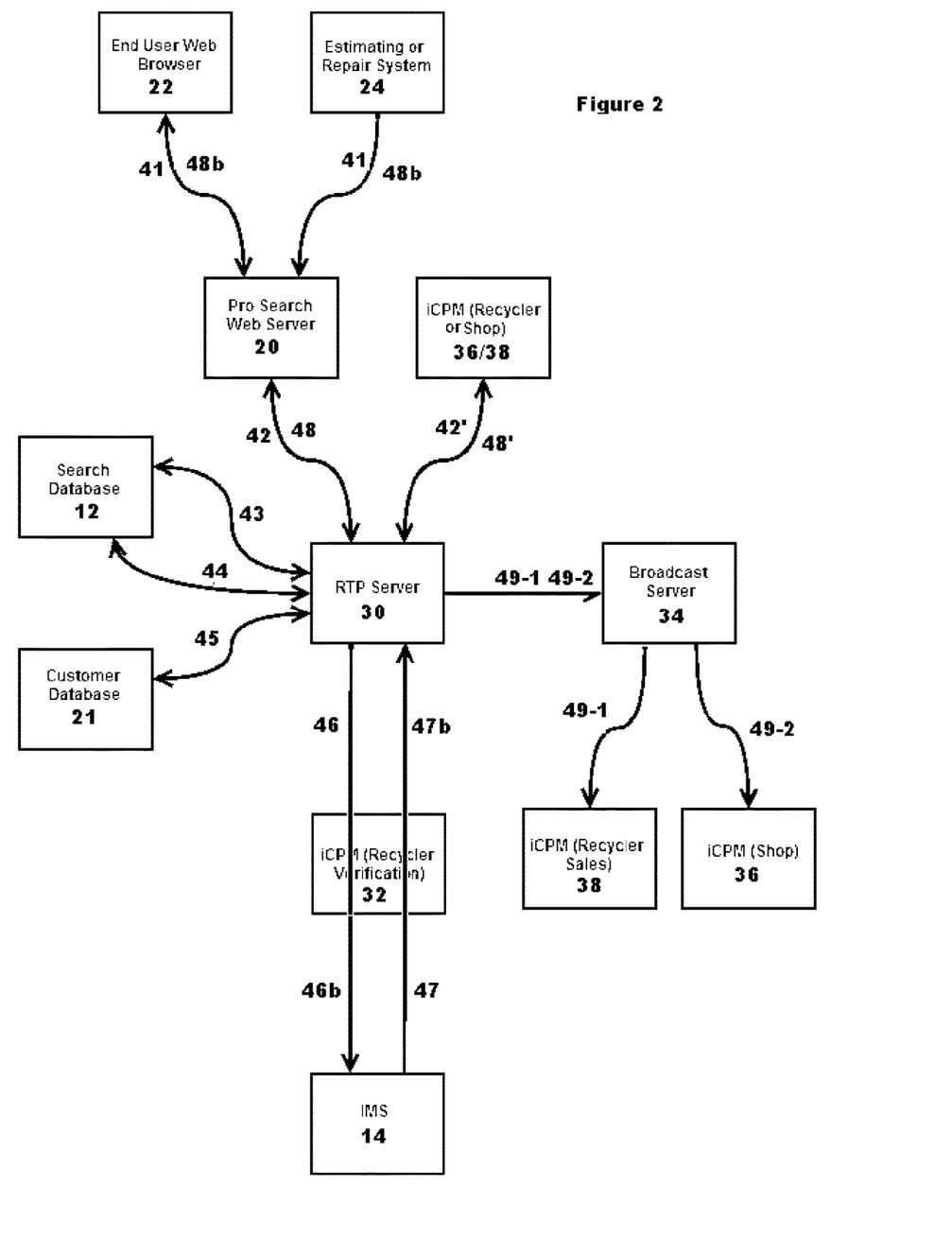
FIG. 2 is a flow diagram more specifically illustrating the use of the components of FIG. 1 in the real time verification of part availability.

Turning now to FIG. 2, a more detailed description can be provided of the data and control flow involved in a real time verification in accordance with the disclosed particular embodiment of the invention. FIG. 2 illustrates the components and systems of FIG. 1 which are involved in a real time verification, but for the purpose of clarity arranged in a process flow arrangement rather than a geographical or system topography arrangement. The data flow events are labeled with reference numerals to facilitate the following discussion.

A customer can initiate RTP verification from search results displayed by web server 20 on a web browser 22, through an integrated system 24, or through an instant messaging client such as iCPM client 36/38. The former is initiated from a search result, which is obtained, e.g., when a customer performs a manual part search through their web browser 22, obtaining search results. Alternatively, search results from web server 20 can be viewed through an integration interface in an estimating/repair/work flow system 24 of the kind used to estimate repair of a damaged vehicle or manage the vehicle repair process. In either case, on the search results, a part verification link (in the form of a button) is written to the page for each part record. When the customer activates this link, a part verification is initiated by a verification message 41. Verification could also occur automatically in response to user activity such as adding a part to an estimate or a repair order, selecting a part for inclusion into a third party system, movement of a part into a cart, initiation of checkout, or the like, or could be performed automatically, for example, for some search results such as the first n. In a responsive communication 42, the search web server then sends a verification request to the RTP server, including key information: part GUID (globally unique ID), checksum, checksum version, broker ID, and supplier ID. Search details are also included, as well as some other identifier fields, as will be elaborated below with respect to the global part link specification in Table I.

A verification request can also "re-verify" a previous part request; for example a "re-verify" request 42' could be generated by an instant message application at, for example, a recycler or repair shop, to follow up on a verification result previously broadcast to that shop. This functionality is provided to permit the re-affirmation of verified parts which appear in an audit trail generated by the process about to be described (e.g., through a "verify" tab in an instant message application which shows previously completed part verification results). The verification request 42 or 42', whether generated from part search results or through a re-verify request, uses a universal part identifier to identify the part of interest, having the data fields elaborated below and in Table I. Re-verify requests differ from verify requests in that they contain a transaction reference to previous verification(s) to enable the re-verify to be related to its predecessor verification(s).

Responding to a verification request 42 or re-verify request 42', the RTP server 30 first reconfirms the verified part in the search database 12 via a database query 43. As the customer search could have been performed substantially before the verification is initiated, the RTP server contacts the part database with query 43 to make sure the part being verified still exists in the search database. The query response 44 will either confirm the part and part details, or indicate the part is no longer in the database. If the part does not exist, the RTP server immediately returns that the part is unavailable, skipping all other steps. In the case that the request 42 or 42' identifies a valid part to verify, the responsive message 44 to the RTP server communicates additional part information from the search database that enables complete verification; the specific data exchange is elaborated below and in Tables IIA and IIB.

After receipt of search database information, the RTP server also retrieves additional information about the recycler and the customer (end user) from the customer database 21 using a message exchange 45; the specific data is elaborated in the RTP to IMS (via iCPM) field specification in Table IIA. This information includes the verification and broadcast JIDs (instant messaging user IDs) required for the remainder of the process. Verification JID(s) indicate which messaging accounts are used to do the verification. Broadcast JID(s) are used to identify the user messaging accounts which receive verification results in the broadcast steps.

RTP server 30 further communicates, via an instant messaging protocol such as XMPP, with a recycler's verification-enabled instant messaging platform 32 (also known as an instant Car-Part messaging platform or iCPM) that is in communication with the recycler's IMS 14. Alternatively, the recycler's iCPM communicates with software that operates on behalf of the IMS (e.g., for those IMS systems that do not natively support real time part verification functions such as checksum computation). In the case where alternative software is used in conjunction with the IMS, messaging will communicate with that software using the same principles as discussed herein referencing direct communication with the IMS. Specifically, the RTP server 30 passes instructions 46 required to perform the verification. These instructions are delivered to the IMS/surrogate software via iCPM—iCPM acts as a pass through entity, passing on the information as an instruction 46*b* to the IMS/surrogate software 14. iCPM 32 maintains a persistent connection to the centralized servers, which provides access to software within the recycler facility. Additionally, iCPM 32 manages the interface and persistent connection to the IMS/surrogate software 14, which is unique to the type of IMS. Once contacted by the RTP server 30, iCPM 32 then performs a query 46*b* at the recycler IMS/surrogate software 14 to collect information needed to verify the continued availability of the identified part, without changes as compared to the presentation of the part in the search database 12 (e.g., no price, condition or location changes). The key part verification fields supplied to the IMS/surrogate software 14 are GUID and checksum version. In one example of the iCPM to IMS connection, applicable to the assignee's "Checkmate" Inventory Management System, the instant message platform 32 leverages JDBC to make a stored procedure call at the recycler IMS 14, which performs a query against the IMS database to gather information which is used to calculate the checksum of the part being verified.

The IMS/surrogate software 14 finds the part specified by the GUID, and uses the designated checksum version to compute a checksum, and returns the checksum to iCPM platform 32, in a message 47 (see Table IIB). iCPM again acts as a pass through entity, managing the connection to the RTP server, and forwards the result message 47*b* on to the RTP server 30.

The RTP server 30 uses the information to make a determination on the verification, with one of four possible results:
  The part is available (part is available and nothing critical, such as price, has changed)
  The part is unavailable
  The part is "probably" available (part is available but something potentially important has changed), or
  The verification service is unavailable (the part verification failed to complete successfully).

The RTP server 30 returns this result in a result message 48 or 48'. In the case of an initial verification, the result 48 is delivered to the web server 20, which then returns the results back to the end user (at a browser or estimating/repair/work flow/inventory system) in a derivative results report 48*b*. Alternatively, in the case of a re-verify, such as one issued from an iCPM instant messenger platform 38 at a recycler or shop, the RTP server returns a results report 48' back to the issuing iCPM platform 38. Re-verify responses 48' differ from initial verify responses 48 in that re-verify responses 48' contain a transaction reference to previous verification(s) to enable the re-verify to be related to its predecessor verification(s).

In addition to the above reporting steps, the RTP server 30 sends two requests 49-1, 49-2 to the Broadcast server 34, to broadcast the verification results out to the iCPM platforms at the selling recycler, and to the iCPM platforms at the potential buyer, e.g., the requesting repair shop. Specifically, using a RTP broadcast API, which in this particular embodiment is implemented with HTTP, a broadcast message regarding the (successful or failed) verification is delivered to a Broadcast Server 34, along with the appropriate instant messaging identities to be notified at the prospective part purchaser and part seller. The broadcast server issues a corresponding instant message with the details of the part search and part verification to the one or more instant messaging accounts at the prospective part buyer and seller, and in appropriate cases to a support representative (in the event of a failed verification). The potential part buyer thus has information in the form of an audit trail of parts that have been verified and the context in which this was done, for later followup in the event a part is not purchased. Also, the part seller staff has information on specific inquiries about that seller's listed parts and an indication of the context of the inquiry to enable follow-up in the event a part is not sold. Most particularly, this information permits seller staff to proactively attempt to make a sale to the potential buyer, potentially through actions such as communication of a decreased price or increase in the available service level (such as faster delivery time), or informing the potential buyer that, despite a discouraging verification result such as "probably available" or "not available", the seller can possibly still provide an acceptable part and level of service. The seller can also react to failures indicating technical faults in the verification process to get service restored. (Particular types of verification results are described in greater detail below.) Broadcast messages to the potential buyer and part seller also differ in the event the verification was a re-verify in that re-verify broadcasts contain a transaction reference to previous verification(s) to enable the re-verify to be related to its predecessor verification(s).

The same set of fields is used for broadcasts 49-1 and 49-2; however, different fields are populated in the two broadcasts, as some information is not displayed to the seller or potential buyer (such as seller/buyer contact information) and thus not used in broadcast 49-1 or 49-2, respectively. After the broadcast server 34 sends the verification results 49-1 and 49-2 to the corresponding seller's iCPM client(s) 38 and potential buyer's iCPM client 36, these display the verification results for audit and follow-up, e.g., in a verification tab within iCPM. In the event the verification was initiated from iCPM as a re-verify, the existing verification entry is updated to reflect the updated status, and indicates multiple verifications have occurred. A part can be re-verified numerous times, if necessary.

The communications described above utilize a construct known as a Universal Part Link (UPL) to securely transfer part, search, and search result information from one application to another. The primary source of data in a part link construct is a search result, but a part link can also be created from any source that has the required information. The objectives of the UPL are:
  Neatly and securely pack the relevant data necessary for transfer to another application
  Store any information specific to the search result itself—such as the delivery time of the part, which can change from one minute to the next, or the total part price, which is a complex aggregate, resulting from the combination of many prices, such as part price, delivery fee, warranty fee, broker fee, etc. These price components, which are not visible on the search result, are also stored. This data is stored in the link displayed so that another application call (such as a part verification) does not generate new values, which may not match the values presented to the user
  Store relevant information about the part, the potential buyer, the supplier, and the broker—such as the part GUID, the potential buyer exchange rate, the supplier ID, and the broker ID, respectively
  Store information about the search parameters, that may be valuable to present elsewhere (for example, when a part is verified, the seller broadcast includes the search parameters, so that the seller is aware of the needs of the potential buyer)

Table I attached hereto provides the field specifications for the UPL.

A second construct used in the communications described above is known as the RTP-IMS (via iCPM) messaging construct. The fields of this construct are shown in the attached Table II; the key fields are a GUID and a checksum version. These fields are passed to an iCPM platform as an arguments string used to make a call to the IMS. The call into the IMS, in the case of a Checkmate IMS, forms a query from the GUID, and returns the checksum for the part with the supplied GUID, using the appropriate checksum logic based on the checksum version supplied with the message. Additional fields may also be included in future implementations such as the quantity of parts (when multiple identical parts are inventoried together with a quantity field).

A final construct used in communication is known as the RTP-iCPM broadcast message, which is delivered as message 49-1 or 49-2 to broadcast verification results. These broadcasts include the verification result (yes, no, probably, service unavailable), potential buyer and seller contact information (if appropriate), as well as information about the part, the search results (such as number of delivery days displayed at the time of the search), and in the case of the seller, the search parameters, the price breakdown, and brokering information. Note that "service unavailable" messages are also broadcast to support representatives. Support broadcasts only occur when there is a service failure, not in the expected case of a successful verification.

Version control/management is a significant challenge in the verification system described herein. There are two aspects in which version incompatibility may arise: interface versions and checksum versions.

Issues with interface versions arise from the fact that the RTP server, iCPM platforms and the IMS/surrogate software may all be upgraded independently of each other. The iCPM and IMS/surrogate software upgrade processes are heavyweight processes and thus are completed over a period of time, rather that instantaneously. This means there will not be version consistency across the enterprise of computing hardware/systems in which the present invention operates. Notably, interface versions, not the software versions, are the focus of the concern with the independent platforms, but because interface updates occur with software updates, the software version on a platform can be used as a proxy for the interface version.

As to checksum versions, the information and logic used to calculate the checksum of a part changes over time. A checksum for a part will be different for different versions of the checksum logic, even if all the part information is the same. With multiple sources of data—IMS databases of parts, and the central database of parts—it is critical to track and manage the checksum version used to compute the checksum of parts so that those checksums are compatible.

The following steps explain, at a high level, how these different versions are managed.

Periodically (e.g., every 20 seconds), each iCPM 32 coupled to an IMS or surrogate software checks its connection by requesting the IMS/surrogate software 14 version. Less periodically (e.g., every 1 hour), each IMS-connected iCPM checks in to an iCPM web services server, and provides the IMS/surrogate software version as well as the iCPM version. In response to this communication, the iCPM web services server updates the customer database 21 with the iCPM and IMS version information.

When a verification request is initiated, RTP server 30 obtains the iCPM 32 and IMS/surrogate software 14 version information from the customer database 21 as part of message exchange 45 (FIG. 2). Before constructing the message 46 it will send to iCPM, the RTP server must consider the RTP version, the iCPM version, and the IMS/surrogate software version, to identify the minimum interface version supported by all three. There is also a minimum version level that is still allowed to be used by the system as a whole—older versions may not be allowed for any number of reasons (security, lack of required functionality, etc.). Assuming all software/interface versions are sufficient to complete a request, the RTP server 30 will construct a verification message 46, including the interface version to be used. The RTP server keeps multiple sets of logic, to allow it to construct older request formats, to handle cases when iCPM platform 32 or the IMS 14 are not up to date with the RTP server. The RTP server also supplies, in message 46, the checksum version that was used to compute the checksum at the time it was uploaded to the search database 12.

The iCPM platform 32 also maintains multiple sets of logic, to allow it to handle older request formats, and uses the interface version supplied by the RTP server 30 to identify which set of logic is needed to make the correct procedure call, to pass the information to the IMS/surrogate software 14. The information is then appropriately sent to the IMS/surrogate software.

The IMS/surrogate software 14 also maintains multiple sets of communication logic (for communication to/from iCPM platform 32), to allow it to handle older request formats. Additionally, the IMS/surrogate software must maintain multiple versions of checksum computation logic, as the version of the interface used for communication and the version of the checksum logic can change independently. The IMS/surrogate software computes the checksum of the part, using the supplied checksum version, and then uses the appropriate version of the interface to return the information back to iCPM platform 32 in message 47.

Finally, iCPM 32 uses the appropriate version of the interface to return the information in message 47b back to the RTP server 30.

If the iCPM platform 32 or the IMS/surrogate software 14 is too dated to complete a procedure call, or if there is a version mismatch resulting from the slight delays in the propagation of version information, the RTP server 30 delivers the version mismatch information through iCPM, per an instant message, to the appropriate support technician so that the problem can be resolved. Additionally, the RTP server logs this information back to the customer database 21.

For illustration purposes, here are some examples of scenarios and how they are handled by this version control logic:

The RTP server 30, iCPM 32 and the IMS/surrogate software 14 are all on the same version, in which new checksum logic was implemented. The IMS/surrogate software was just updated today, so the part in the search database was uploaded yesterday using the old checksum logic. Even though all parties can all support the latest checksum logic, the RTP server has to pass down part information with a checksum compatible with the checksum version in the customer database 21. The IMS/surrogate software maintains the old checksum logic, and therefore is able to compute the checksum for the part using the old logic, allowing the system to determine whether anything has changed on the part.

The RTP server 30 is updated with a new version of the RTP software, which includes an updated version of the interface with a useful new field. iCPM 32 and the IMS/surrogate software 14 are still on the old version of the interface. When an RTP verification comes through, constructing a message with the new field would result in an error when iCPM processes the message. However, RTP checks the database, determines iCPM and the IMS/surrogate software are on the older version, RTP constructs the message with the older version, allowing for a successful verification.

The RTP server 30 has been updated with the new version of RTP software for some time. Additionally, the roll out of the new iCPM 32 version has been completed. However, one recycler has not updated its IMS/surrogate software 14 in a year. The new version of RTP server and iCPM software includes a new interface version, which has a vital new field added. If the RTP server were to construct a message on the current version, it would fail when iCPM tried to communicate with the IMS/surrogate software. If the RTP server were to construct a message using the older version, the call could succeed, but vital information, which is required for a quality user experience in the current environment, would be missing. When the RTP server checks the customer database 21 and determines the IMS/surrogate software does not meet the minimum standards, RTP informs a Car-Part support technician of the problem, allowing them to contact the customer to fix the problem, which allows full RTP functionality to be restored relatively quickly.

The present invention encompasses broad aspects which are capable of implementation in a number of forms and embodiments. All embodiments contemplated hereunder that achieve the benefits of the invention therefore have not been shown in complete detail. For example, principles of the present invention may be applied to supply chain management outside of the context of vehicle parts, salvage yards, part warehouses, and the like. Other supply chains facing similar challenges can also take advantage of the inventive concepts. Examples may include collectible items, artwork, and components used for custom manufacturing, among others. Other embodiments may therefore be developed without departing from the spirit of the invention.

What is claimed is:

1. A method for verifying the availability of vehicle parts for sale, wherein the parts are presented from a centralized inventory system that includes information compiled via regular synchronization from plural independent inventory systems, the method comprising:
    receiving a verification request or notice of a trigger event at a computer system hosting the centralized inventory system,
    responding to said verification request or trigger event in said computer system, to formulate a verification message for a particular part identified in the centralized inventory system, the verification message including identifying information for the part, and comparison data regarding the part in the centralized inventory system of relevance to a potential buyer;
    transmitting the verification message from said computer system to a remote computer system hosting an independent inventory system indicated in the central inventory system as carrying the particular part; and
    in the remote computer system, responding to the verification message by verifying the availability of the part identified by the part identifying information, and comparing the comparison data to comparison data shown in the independent inventory system, and
    using and/or reporting the results of the verifying step in the centralized inventory system.

2. The method of claim 1 wherein the comparison data is a checksum computed over data regarding the part.

3. The method of claim 1 wherein the comparison data is particular fields of data regarding the part.

4. The method of claim 1 wherein the verification message is triggered by a potential buyer explicitly requesting availability verification for the particular part.

5. The method of claim 1 wherein the verification message is triggered by a potential buyer's action implicitly requiring verification for the particular part.

6. The method of claim 5 wherein the potential buyer's action implicitly requiring verification comprises placing the particular part in a virtual shopping cart or in a hold for purchase status.

7. The method of claim 5 wherein the potential buyer's action implicitly requiring verification comprises the potential buyer initiating a purchase of the particular part.

8. The method of claim 5 wherein the potential buyer's action implicitly requiring verification comprises the potential buyer placing a part on a repair order or estimate.

9. The method of claim 1 wherein the verification message is triggered by an appraiser action implicitly requiring verification.

10. The method of claim 9 wherein the appraiser action comprises adding a part to an estimate.

11. The method of claim 1 further comprising reporting the results of the verification to a buyer, seller or supplier of the part.

12. The method of claim 11 wherein the seller of the part is a broker presenting the particular part for sale from the inventory of a part supplier independent of the broker.

13. The method of claim 12 wherein the independent inventory system inventories parts available for sale from the part supplier.

14. The method of claim 1 further comprising obtaining a re-verification message for a particular part that has been previously subject to the verification message from the potential buyer.

15. The method of claim 1 wherein the verification message is formulated using a checksum generated according to a first checksum algorithm version, and the independent inventory system stores checksum data according to a second checksum algorithm that creates different results than the first checksum algorithm, wherein the independent inventory system computes a checksum for the particular part using the first checksum algorithm for comparison with the checksum in the verification message.

16. The method of claim 1 wherein the independent inventory system stores checksum data according to a first checksum algorithm, and centralized inventory system stores checksum data generated according to a second checksum algorithm version that creates different results than the first checksum algorithm, formulation of a verification message comprising computing a checksum for the particular part using the first checksum algorithm for comparison with the checksum stored in the independent inventory system.

17. The method of claim 1 wherein the plurality of independent inventory systems comprise inventory systems that utilize data formats and fields that differ between at least two independent inventory systems, the data from the independent inventory systems being normalized for storage in the centralized inventory database.

18. The method of claim 1 wherein a part identifier for a particular part is defined by the independent inventory management system indexing the particular part.

19. The method of claim 1 wherein a part identifier for a particular part is generated as part of compiling the particular part into the centralized inventory management system.

20. The method of claim 1 wherein the centralized inventory management system indexes information on source vehicles for parts, further comprising including in the comparison data for a particular part information regarding the source vehicle for the particular part.

21. The method of claim 20 wherein the source vehicle information included in the comparison data comprises the location of the vehicle.

22. The method of claim 20 wherein the source vehicle information included in the comparison data comprises the location category of the vehicle.

23. The method of claim 20 wherein the source vehicle information included in the comparison data comprises the VIN of the vehicle.

24. The method of claim 20 wherein the source vehicle information included in the comparison data comprises the mileage of the vehicle.

25. The method of claim 1 wherein the part identification data and/or comparison data represents a group of more than one part having similar attributes.

26. The method of claim 1 wherein the comparison data is a checksum computed over data regarding the part in the centralized inventory, and further comprising computing a comparison checksum for verification use from data obtained from the independent inventory management system on behalf of the inventory system.

27. The method of claim 1 wherein the verification message is triggered on behalf of a potential part buyer viewing a part which is held by a part seller and listed for sale by a part broker, wherein the verification message is delivered to the independent inventory management system of the part seller.

28. The method of claim 27 wherein the result of the verification message is broadcast to the part broker.

29. The method of claim 27 wherein the result of the verification message is broadcast to the part supplier.

30. The method of claim 27 wherein the verification message is triggered on behalf of a potential part buyer viewing a part which is held by a part seller and listed for sale by a first part broker on behalf of a second part broker, wherein the verification message is delivered to the independent inventory management system of the part seller.

31. The method of claim 30 wherein the verification result is broadcast to at least one of the first and second part brokers.

32. The method of claim 30 wherein the verification result is broadcast to the part supplier.

33. The method of claim 1 further comprising formulating a verification message for a plurality of part search results obtained from the centralized database, and displaying those part search results which have been verified in response to the verification messages.

34. The method of claim 1 wherein the verification message is delivered to surrogate software that queries the independent inventory management system to obtain part information.

* * * * *